United States Patent
Wiesbeck et al.

(10) Patent No.: US 7,961,139 B2
(45) Date of Patent: Jun. 14, 2011

(54) DIGITAL BEAM FORMING USING FREQUENCY-MODULATED SIGNALS

(75) Inventors: Werner Wiesbeck, Keltern (DE); Karin Schuler, Ulm (DE); Denis Becker, Ulm (DE)

(73) Assignee: Karlsruhe Institute of Technology, Karlsruhe (DE)

( * ) Notice: Subject to any disclaimer, the term of this patent is extended or adjusted under 35 U.S.C. 154(b) by 0 days.

(21) Appl. No.: 12/371,733

(22) Filed: Feb. 16, 2009

(65) Prior Publication Data
US 2009/0219208 A1 Sep. 3, 2009

(30) Foreign Application Priority Data
Feb. 29, 2008 (DE) .......................... 10 2008 011 889

(51) Int. Cl.
*G01S 13/00* (2006.01)
(52) U.S. Cl. ......... 342/147; 342/107; 342/113; 342/139
(58) Field of Classification Search .................. 342/107, 342/113, 133, 139, 147–158
See application file for complete search history.

(56) References Cited

U.S. PATENT DOCUMENTS

| 6,573,859 B2 | 6/2003 | Tokoro ............................ 342/70 |
| 2006/0028375 A1 * | 2/2006 | Honda et al. .................... 342/70 |

FOREIGN PATENT DOCUMENTS
WO    WO 2005098471 A2 * 10/2005

OTHER PUBLICATIONS

Schuler et al.; *Array Design for Automtive Digital Beamforming Radar System* Proceedings of IEEE Inernational Radar Conference, pp. 435-440, May 2005.

* cited by examiner

*Primary Examiner* — Thomas H Tarcza
*Assistant Examiner* — Timothy A Brainard
(74) *Attorney, Agent, or Firm* — Renner Kenner Greive Bobak Taylor & Weber (57) ABSTRACT

The present invention relates to a method for angular determination and/or for increasing the angular resolution or a detectable angular range when operating antenna groups using the technique of digital beam forming (DBF), as well as a device for carrying out the method. In the method, a measurement signal with a carrier signal and a frequency-modulated signal component are received via at least one antenna group directly or after reflection on one or several objects. The angle, at which the measurement signal is received, is determined by evaluating a phase difference in the received measurement signal which occurs between adjacent antenna elements of the antenna group. The method is characterized in that for determining the phase difference the frequency-modulated signal component is also evaluated, exclusively or additionally to an evaluation of the carrier signal. As a result of the method and the device, the angular resolution and/or the angular range which is detected in an unambiguous manner may be increased in a cost-effective manner with digital beam forming.

15 Claims, 3 Drawing Sheets

DIGITAL BEAM FORMING USING FREQUENCY-MODULATED SIGNALS

TECHNICAL FIELD OF APPLICATION

The present invention relates to a method for angular determination and/or for increasing the angular resolution and/or a detectable angular range when operating antenna groups using the technique of digital beam forming, in which a measurement signal comprising a carrier signal and a frequency-modulated signal component is received via at least one antenna group directly or after reflection on one or several objects and an angle, at which the measurement signal is received by the antenna group, is determined by evaluating a phase difference in the received measurement signal, which occurs between adjacent antenna elements of the antenna group when receiving the measurement signal. The invention also relates to a device for digital beam forming which is designed to carry out the method.

The method and the device use the technique of digital beam forming also denoted as DBF (DBF: Digital Beam Forming), in which for each receiver and/or for each antenna element used as a receiver the received signals are separately digitalised and further processed, whereby subsequent beam forming is possible when scanning an area to be monitored. By means of the method of digital beam forming, the angle may thus be determined at which, for example, radar signals are received. In the known prior art, the phase difference at a plurality of synchronously operating receiver-antenna elements in an antenna group and/or an antenna array is additionally utilized to this end. In this connection, in the known prior art any signals with a low modulation index are used as measurement signals, so that the signals are quasi-monofrequency signals. The signal processing takes place monofrequently.

PRIOR ART

Thus K. Schuler, M. Younis, R. Lenz and W. Wiesbeck in "Array Design for Automotive Digital Beamforming Radar System", Proceedings of IEEE International Radar Conference, pp 435-440, May 2005, describe a method as well as a device for monitoring an area using the technique of digital beam forming, in which an antenna array is used with a plurality of transmitters and a plurality of receivers. The monitored area is depicted by means of radar, the spatial position of objects in the monitored area being determined by the dimensions of distance and angle. The angular resolution results from the phase differences of the signals received simultaneously by the different receivers.

In the known embodiments of DBF antenna groups, care has to be taken that the maximum phase difference $\Delta\phi$ determined by the maximum reception angle position $\psi_{max}$ does not exceed $2\pi$ at adjacent antenna elements. This requirement results in the maximum permissible distance d of the antenna elements of the respective antenna group. As a result, the physical extent of the antenna group, the so-called aperture D, is determined by the maximum reception angle to be determined and the number of antenna elements of the antenna group and/or the antenna array. The size of the aperture D is reduced with the maximum reception angle $\psi_{max}$ to be determined. On the other hand, the angular separation capability, i.e. the angular resolution is inversely related to the size of the aperture D. The angular resolution $\Delta\psi$ becomes worse with a smaller aperture. With a uniform number of antenna elements in a DBF antenna group, the angular resolution $\Delta\psi$ and the maximum reception angle $\psi_{max}$ to be determined are in opposition. If the above boundary condition is not observed, ambiguities arise when determining the angle, so-called grating lobes, when the phase difference $\Delta\phi$ of adjacent antenna elements is greater than $2\pi$.

When operating antenna groups using the technique of digital beam forming, therefore, hitherto either a compromise had to be made between the size of the angular range $\psi_{max}$ which may be clearly assigned and the angular resolution $\Delta\psi$ or the number N of antenna elements had to be increased, so that beyond a large aperture D, with relatively small distances d between the antenna elements, phase differences of greater than $2\pi$ are avoided. If the number N of the antenna elements is increased, in order to achieve a good angular resolution $\Delta\psi$ in a large unambiguous angular range, however, the costs of such an antenna array and the underlying radar circuit increase. With a given size of the antenna elements, additionally the distances d may not be freely selected, as if the distances are too small, couplings of the antenna elements occur which cause additional errors when determining the angle.

DE 10105240 A1 discloses a radar apparatus with a reception array antenna having a plurality of antenna elements, a first bearing detector for detecting a bearing of a target by carrying out signal processing on individual element signals received on an element-by-element basis through the respective antenna elements, and a second bearing detector for detecting a bearing of a target by carrying out signal processing different from that of the first bearing detector, on the individual element signals received through the respective antenna elements. For the determination of reception angle or direction a subdivision into near-field and far-field is made and the two fields are processed in a different manner. The processing is complex. This document does not deal with the problems of grating lobes.

DESCRIPTION OF THE INVENTION

It is an object of the present invention to provide a method for angular determination by means of digital beam forming as well as a device for carrying out the method, by which the angular resolution and the angular range, which may be detected in an unambiguous manner, may be cost-effectively increased or by which an alternative possibility for the angular determination is provided.

The object is achieved with the method according to Claim 1 and the device according to Claim 9. Advantageous embodiments of the method and of the device form the subject of the dependent claims or may be derived from the following description as well as the embodiment.

In the proposed method, a measurement signal, which in addition to a carrier signal also comprises a frequency-modulated signal component, is directly received via at least one antenna group or after reflection on one or several objects. The angle, at which the measurement signal is received by the antenna group, is determined by evaluating a phase difference in the received measurement signal, which occurs between adjacent antenna elements of the antenna group when receiving the measurement signal. The proposed method is characterised in that for determining the phase difference, additionally to the previously carried-out evaluation of the carrier signal, the frequency-modulated signal component is also evaluated or the frequency-modulated signal component is exclusively evaluated.

It is essential in this connection that the frequency-modulated signal component contributes to the angular determination alone or in combination with the carrier signal.

By the additional evaluation of the frequency-modulated signal component, ambiguities in the angular determination may be identified and resolved, so that without altering the number N of antenna elements an unambiguous angular determination is achieved over a greater angular range $\psi_{max}$ than previously. In contrast, by means of the method, even with an angular range $\psi_{max}$ which remains the same and which may be detected in an unambiguous manner, the angular resolution $\Delta\psi$ may be increased without altering the number N of antenna elements, as the interval d of the antenna elements may be increased without considering the previously occurring ambiguities. Moreover, with the proposed method, if required, even the number N of antenna elements may be reduced without altering the angular range $\psi_{max}$, which may be assigned in an unambiguous manner, and the angular resolution $\Delta\psi$.

If the size of the unambiguous angular range $\psi_{max}$, maintaining a good angular resolution $\Delta\psi$, is increased in the previous prior art, this leads to phase differences $\Delta\psi$ at adjacent antenna elements of greater than $2\pi$. With the proposed method, such phase differences at adjacent antenna elements of greater than $2\pi$ may be identified and thus made unambiguous. This means that with a phase difference of $\Delta\phi=n\cdot2\pi+\phi_{diff}$ where $n=0, 1, 2, \ldots$ the factor n may be determined. This determination takes place by the evaluation of the additional signal component. The additional signal component is in the proposed method obtained by a frequency modulation of the measurement signal.

The provision of a measurement signal with a frequency-modulated signal component generally does not represent any additional cost, as such a signal component is already present in many applications. Thus the frequency modulation of the measurement signal represents a common method in radar technology, in order to improve the distance resolution. The frequency modulation is accordingly used in any case, when the distance from objects is to be determined by means of the class of the pulsed chirp radar system or FMCW radar system. The frequency modulation is ignored in the previous DBF-processing methods, as generally in this application it only comprises a low frequency deviation, and the signal is thus quasi-monofrequent. The proposed method is thus characterised by this frequency-modulated signal component, which was hitherto ignored for the angular determination, being specifically evaluated. The measurement signal is thus evaluated in all its signal components, so that the hitherto monofrequent signal processing in DBF is increased by a signal processing adapted to the frequency modulation. The evaluation of two signal components in one antenna group is equivalent to the evaluation of two different antenna groups, in which respectively the same signal is used with only one signal component. Thus the evaluation of both signal components replaces the formation of a second antenna group, in particular in cases in which the bandwidth B of the frequency modulation is in the order of magnitude of the carrier frequency, i.e. namely between $0.1\cdot f_0$ and $f_0$.

With suitable dimensioning of this one antenna group and/or with a suitable choice of carrier frequency $f_0$ and bandwidth B of the frequency modulation, the achievable angular resolution and the size of the angle segment which may be clearly depicted may be made independent of one another. It is possible for high transmitter frequency $f_0$, that $\Delta\phi_0=2\pi\cdot\Delta r/\lambda_0>2\pi$, if $\Delta r>\lambda_0$, $\Delta r$ corresponding to the difference in the distance between adjacent antenna elements from a point target, from which the measurement signal is received. The unambiguity is achieved by the low modulation frequency $f_{FM}$, as $\Delta\phi_{FM}=2\pi\cdot\Delta r/\lambda_{FM}$ is substantially less than $2\pi$, as $\lambda_{FM}$ is very high relative to $\lambda_0$. When multiplying the two results, the high angular resolution is achieved by $f_0$ and the unambiguity by $f_{FM}$. Both frequencies are present simultaneously in a frequency-modulated radar signal. The type of frequency modulation is in this case not important. Thus, for example, it may be a chirp, i.e. a linear modulation, or even a quadratic modulation.

The device used for implementing the method for digital beam forming comprises at least one antenna group for receiving a measurement signal, which comprises a carrier signal and a frequency-modulated signal component, and an evaluation device. The evaluation device evaluates the measurement signal received via the antenna group by means of digital beam forming, in order to determine at least the angle at which the measurement signal is received by the antenna group. The angle is determined by evaluating a phase difference in the received measurement signal, which occurs between adjacent antenna elements of the antenna group when receiving the measurement signal. The evaluation device is thus configured such that for determining the phase difference it also evaluates exclusively, or additionally to an evaluation of the carrier signal, the frequency-modulated signal component.

By utilizing the frequency-modulated component, the compromise may be avoided that conclusions generally have to be drawn between the angular range which may be depicted in an unambiguous manner and the achievable angular resolution. To this end, the antenna group is designed relative to the carrier frequency and the bandwidth of the signal such that, for example with conventional DBF processing, also denoted hereinafter as CW-DBF, by evaluating the carrier signal component a good angular resolution is achieved and with the additional evaluation of the frequency-modulated signal component, also denoted hereinafter as FM-DBF, a larger, unambiguous angular range is achieved. Without the above advantage, the angle may also be exclusively determined by utilizing the frequency-modulated component (FM-DBF).

The method and the device may in this connection primarily be used advantageously in radar technology. Naturally, however, other application fields are also possible, such as for example an application in communication technology for determining the direction of incidence of transmitted signals, if said signals comprise low frequency components.

In a preferred embodiment of the method as well as the device, therefore, not only angles but also distances from one or more objects are determined. In this connection, preferably from one or more transmitters of the device, a frequency-modulated radar signal is transmitted as a measurement signal and, after reflection on one or several objects in a monitored area, is received via at least one antenna group. After distance compression for determining the distance of the one or several objects, on which the radar signal has been reflected, the angular compression relative to the carrier frequency component and the angular compression relative to the frequency-modulated component then take place. The techniques of distance compression and angular compression are known to the person skilled in the art from the processing of signals previously carried out during digital beam forming. The angular compression is based on a discrete Fourier transform. In contrast to conventional DBF processing, during the evaluation of the frequency-modulated component a standardization to $\lambda_{FM}$ may be used.

Particularly advantageously, the method and the device may be used if the frequency modulation may be selected in the order of magnitude of the carrier frequency. In this case, the two signal components, i.e. the signal component based on the carrier frequency as well as the frequency-modulated signal component, may be easily evaluated simultaneously.

The bandwidth of the frequency modulation should in this case preferably be at least 20% of the carrier frequency.

If such a large bandwidth of the frequency modulation is not possible, such as for example in measurement signals used hitherto in motor-vehicle close-range radar technology, the signal component based on the frequency modulation during the evaluation is therefore very small relative to the component based on the carrier frequency. In this case, it is advantageous to evaluate the two components separately, it being intended that for the evaluation of the frequency-modulated signal component, the signal component based on the carrier frequency is eliminated. This may take place by a sequential measurement, in which during the first measurement a measurement signal is used with an up-chirp and during the second measurement a measurement signal is used with a down-chirp or vice versa. By combining both measurements, the signal component based on the carrier frequency may be eliminated, so that the signal component based on the frequency modulation may be evaluated separately. An elimination of the signal component based on the carrier frequency may be also implemented by other techniques, and is only necessary in cases in which the frequency-modulated signal component is very small relative to the signal component based on the carrier frequency.

In one embodiment, in particular if the bandwidth of the frequency modulation is small relative to the carrier frequency, at least two antenna groups are used for the method and the device, in which the antenna elements of the first antenna group are adjusted to a high resolution by evaluating the carrier frequency and the antenna elements of the second antenna group are adjusted to the unambiguity by evaluating the frequency-modulated signal component. This adjustment relates to the distance between the individual antenna elements. Both antenna groups may also have common antenna elements. All antenna elements of the two antenna groups may also coincide. Particularly advantageously, the antenna elements of the first antenna group and the second antenna group are adjusted to one another such that during processing of the digital beam forming for determining the angle, ambiguities in the group factor of the first antenna group fall to a specific value, preferably to minimum values or zero settings, of the group factor of the second antenna group.

BRIEF DESCRIPTION OF THE DRAWINGS

The proposed method and the associated device are described again in more detail hereinafter with reference to an embodiment in combination with the drawings, in which.

WAYS OF IMPLEMENTING THE INVENTION

Figure 1:
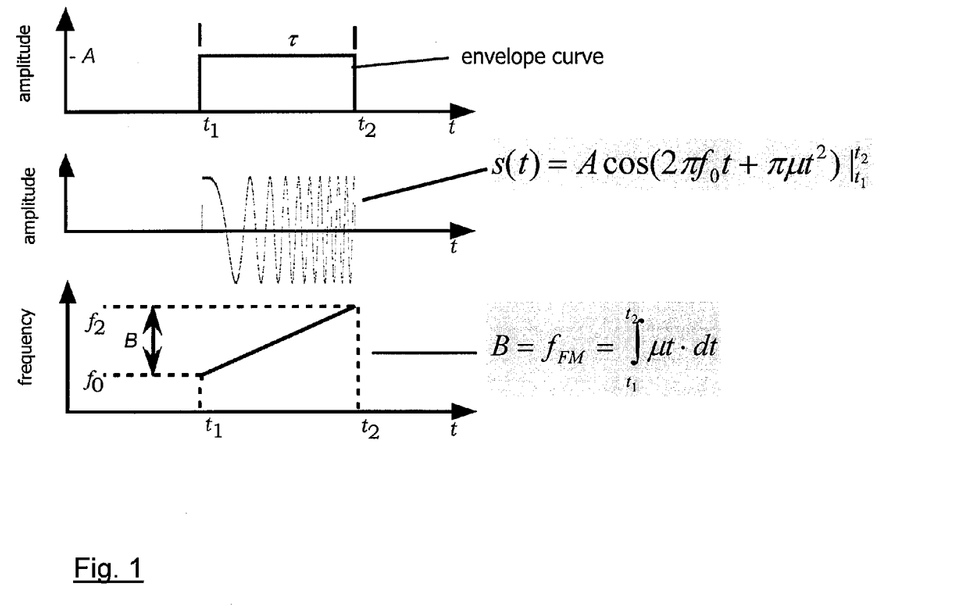
FIG. 1 shows an example of a measurement signal comprising a carrier frequency and a frequency-modulated signal component, as may be used in the proposed method.

The exemplary embodiment disclosed hereinafter relates to an application of the method and the device to the field of motor-vehicle close-range radar. In this field, generally a measurement signal is used with a carrier frequency of $f_0=24$ GHz and a bandwidth of the frequency modulation of $B=250$ MHz or even up to 5 GHz. FIG. 1 shows an example for such a frequency-modulated radar signal, which is generated as a pulsed chirp signal. The evaluation of the phase differences based on the carrier frequency is denoted hereinafter as CW-DBF, the evaluation based on the frequency-modulated signal component is denoted as FM-DBF. In order to distinguish CW-DBF and FM-DBF clearly from one another, in this connection the wavelength belonging to the carrier frequency is explicitly denoted by $\lambda_{CW}$ and the wavelength belonging to the frequency modulation is denoted by $\lambda_{FM}$. The received signal $s_R(t)$ of the antenna group results in:

$$s_R(t) = A_R \cdot rect\left[\frac{t - \frac{R_{Txu} + R_{Rxv}}{c_0}}{T_P}\right] \cdot$$

$$\frac{e^{j2\pi f_0 t} \cdot \underbrace{e^{-j\frac{2\pi}{\lambda_{CW}}(R_{Txu}+R_{Rxv})}}_{\text{CW exponential term}} \cdot \underbrace{e^{j2\pi k_e\left(t-\frac{R_{Txu}+R_{Rxv}}{c_0}\right)^2}}_{\text{FM exponential term}}}{}$$

$R_{Txu}$, $R_{Rxv}$, $T_P$ and $A_R$ denote in this case the distance from the object to the receiver $T_{xu}$, the distance from the object to the receiver $R_{xv}$, the pulse duration of the radar signal and the complex amplitude of the received signal. The CW exponential term and the FM exponential term may be differentiated in this received signal. In conventional CW-DBF the azimuth processing is carried out using the CW exponential term. Its phase has a time-independent linear path of between 0 and $2\pi$ and its unambiguous range is substantially determined by the relatively small wavelength $\lambda_{CW}$ of the carrier signal in the denominator.

The FM exponential term which is also used hereinafter for azimuth processing with FM-DBF, has a time-dependent quadratic path. Its unambiguous range, however, at constant time t is primarily determined by the chirp rate $k_e=B/(2T_p)$ in the numerator. In both cases, i.e. the conventional CW-DBF and the new FM-DBF concept, the actual unambiguous range depends on antenna distance. From the above equation, it may be seen that two exponential terms are contained in the received signal, which initially are superimposed and in principle are both available for evaluation.

Hereinafter, the angular compression function, the so-called kernel function, is derived for the processing of frequency modulated signals with FM-DBF. The angular compression function for CW-DBF is known from the prior art, as CW-DBF corresponds to the previous method for determining the angle.

The angular compression in FM-DBF also takes place after the distance compression which is also known from the prior art for determining the distance of objects. Thus this type of processing may also be denoted as serial processing. As a result of the pulse compression, the target separation has already taken place in the distance direction. The distance compressed signal, at which the angular processing is to take place, for the pulsed chirp signal is as follows:

$$f_{RC,RvTu}(\tau) = A_T A_R \frac{\sin(2\pi k_e(T_P|\tau - \tau_{nuv}| - (\tau - \tau_{nuv})^2))}{2\pi k_e(\tau - \tau_{nuv})}$$

$$rect\left[\frac{|t - \tau_{nuv}|}{T_P}\right] \underbrace{e^{-j\frac{2\pi}{\lambda_{CW}}(R_{Txu}+R_{Rxv})}}_{\text{CW term}} \underbrace{e^{j2\pi k_e T_P\left(\tau - \frac{R_{Txu}+R_{Rxv}}{c_0}\right)}}_{\text{FM term}}$$

$A_T$ denotes in this case the complex amplitude of the transmitted signal, $\tau_{nuv}$ the propagation time to the object n, starting from the transmitter $T_{xu}$ to the receiver $R_{xv}$. The first exponential term is the CW term, which is conventionally utilized for DBF. It is not relevant for the derivation of the kernel function for angular compression for FM-DBF, as this angular compression is only intended to take place using the FM-term. For this reason, in this case, only the FM term is considered further.

$$f_{RC,RvTu}(\tau) \sim \underbrace{e^{j2\pi k_e T_P\left(\tau - \frac{R_{Txu}+R_{Rxv}}{c_0}\right)}}_{\text{FM term}}$$

The angular compression takes place for each distance cell individually. If a distance cell is considered, τ=const for all transmitter-receiver combinations and thus is not relevant for the azimuth processing. As a result, only the term:

$$f_{RC,RvTu}(\tau) \sim e^{-j2\pi \frac{B}{2c_0}(R_{Txu}+R_{Rxv})}$$

remains for evaluation. If the modulation wavelength $\lambda_{FM}$ is defined, to result in:

$$\lambda_{FM} = \frac{2c_0}{B}$$

from the term which is relevant for processing:

$$f_{RC,RvTu}(\tau) \sim e^{-j\frac{2\pi}{\lambda_{FM}}(R_{Txu}+R_{Rxv})}$$

a format results which is analogous to conventional DBF.

In this case, the angular compression starts with FM-DBF. The angular compression is, similar to CW-DBF, a correlation between the received signal and the complex conjugate of a reference function. The correlation is implemented as a summation via all transmitters and receivers, via the multiplication of the received signal and reference signal in the time range. The angular compressed signal $f_{AC,FM}$ is thus dependent on the focusing angle $\psi_0$:

$$f_{AC,FM}(r_0, \psi_0) = \sum_{u=1}^{M}\sum_{v=1}^{N} k_{u,v} \cdot \left[ e^{-j\frac{2\pi}{\lambda_{FM}} K_{AC}(\vec{y}_{Tu},\vec{y}_{Rv},r_0,\psi_0)} \right]^* e^{-j\frac{2\pi}{\lambda_{FM}}(R_{Txu}+R_{Rxv})}$$

M denoting the number of transmitter antennae and N denoting the number of receiver antennae. For the path $R_{Txu}+R_{Rxv}$ hereinafter for simplification an approximation is used. The kernel function $K_{AC,FM}$ corresponds to the estimated path from the transmitter to the object and to the receiver for the focusing angle $\psi_0$. By utilizing frequency modulation, the angular compressed signal $f_{AC,FM}$ results in:

$$f_{AC,FM} \approx e^{-j\frac{2\pi}{\lambda_{FM}} 2r_n} \sum_{u=1}^{M}\sum_{v=1}^{N} k_{u,v} \cdot \begin{bmatrix} \underbrace{e^{-j\frac{2\pi}{\lambda_{FM}}\left(|\vec{y}_{Tu}|^2+|\vec{y}_{Rv}|^2\right)\left(\frac{1}{2r_n}-\frac{1}{2r_0}\right)}}_{\text{near-field term}} \\ e^{j\frac{2\pi}{\lambda_{FM}}(x_{Tu}+x_{Rv})(\cos(\psi_n)-\cos(\psi_0))} \\ e^{j\frac{2\pi}{\lambda_{FM}}(y_{Tu}+y_{Rv})(\sin(\psi_n)-\sin(\psi_0))} \end{bmatrix}$$

$k_{u,v}$ corresponds to the factor of an assignment function for the transmitter antenna $T_{xu}$ and the receiver antenna $R_{xv}$. $\vec{y}Tu$ and $\vec{y}Rv$ provide the positions, $y_{Tu}$ and $y_{Rv}$ provide the Y coordinates of the transmitter antenna $T_{xu}$ and the receiver antenna $R_{xv}$. $x_{Tu}$ and $x_{Rv}$ denote the X-coordinates of the transmitter antenna $T_{xu}$ and the receiver antenna $R_{xv}$. $\psi n$ denotes the azimuth angle of the reflector n, r0 any distance for focusing. The target distance $r_n$ may be assumed to be constant and has no importance for the angular compression. The first exponential term within the sum represents the near-field term. Thus this equation describes the angular compressed signal of a point target. In this connection, merely the positions of the transmitter and of the receiver are known. After distance compression, also the target distance $r_n$ is known. The angle $\psi_0$ of the reference function may be understood as a test direction. If in this equation the test angle $\psi_0$ and object angle $\psi_n$ coincide, the angular compression produces a maximum value with the value M·N.

By this additional evaluation by means of FM-DBF, ambiguities in CW-DBF may be eliminated. In principle, in this case a simultaneous evaluation of the CW-phase term and FM-phase term is possible, as for example is known in the field of SAR processing by the term delta-k-technique for phase development. To this end, the phase terms have to have frequencies in the same order of magnitude. This is, however, not the case in the typical frequencies and bandwidths of motor-vehicle radar-technology used in the present example. For this reason, in this case by means of a specific method the CW-phase term is eliminated, in order to provide thereby the FM-phase term independently for the evaluation. To this end, the received signal after distance compression is once again provided as:

$$f_{RC,RvTu}(\tau) = A_T A_R \frac{\sin(2\pi k_e(T_P|\tau - \tau_{nuv}| - (\tau - \tau_{nuv})^2))}{2\pi k_e(\tau - \tau_{nuv})}$$

$$rect\left[\frac{|t - \tau_{nuv}|}{T_P}\right] \underbrace{e^{-j\frac{2\pi}{\lambda_{CW}}(R_{Txu}+R_{Rxv})}}_{\text{CW term}} \underbrace{e^{j\frac{2\pi}{\lambda_{FM}}(\tau c_0 - (R_{Txu}+R_{Rxv}))}}_{\text{FM term}}$$

The second exponential term corresponds to the FM term which may be utilized with FM-DBF. The CW term is, however, superimposed. Both terms signify a modulation of the received signal via the transmitter and receiver group. In this case, the path $R_{Txu}+R_{Rxv}$ is of particular importance. For targets in the distant field, the path difference and thus the phase difference for antennae along the Y-axis is proportional to sin ($\psi_n$). In this case, the CW term is changing more rapidly than the FM term, if the conventional parameters, such as for example a carrier frequency $f_0$=24 GHz and $k_e$=B/(2·$T_P$)=500 MHz/(2·0.5 µs), are assumed. The wavelengths thus are $\lambda_{FM}$=1.2 m and $\lambda_{CW}$=12.5 mm. The further the carrier frequency $f_0$ and the bandwidth are apart, the more marked is this difference. For this reason, in conventional CW-DBF, the FM exponential term may be ignored. If it were desired to utilize this FM-exponential term, however, the CW exponential term would produce interference as a result of its high frequency.

Figure 2:
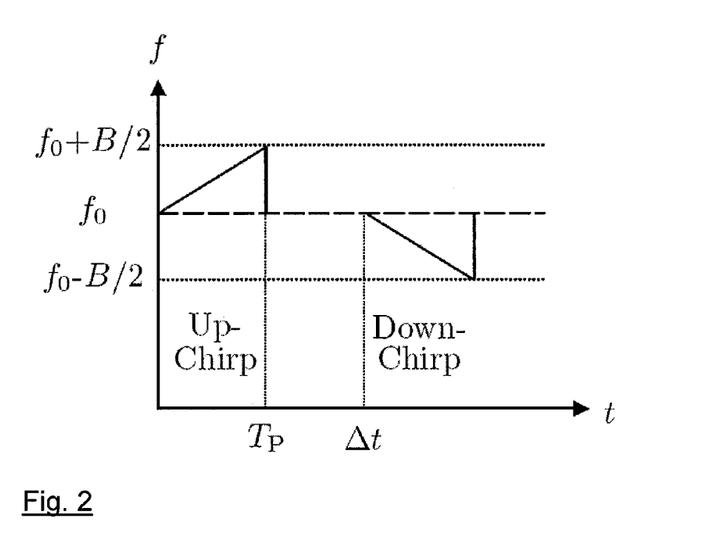
FIG. 2 shows an exemplary frequency response curve for up-chirp and down-chirp.

Hereinafter, a new and efficient method is proposed in order to eliminate the CW exponential term and the periodicity involved therewith. In this case it consists of two sequential measurements, in which alternately an up-chirp and a down-chirp is used in the measurement signal. On each receiver, two measurements are carried out at a distance of Δt. In this case, the first measurement is carried out with an up-chirp and the second measurement is carried out with a down-chirp, time delayed by Δt. FIG. 2 shows the frequencyresponse curve for up-chirp and down-chirp. For the signals the following applies:

$$s_{Tu,up}(t) = A_T \cdot e^{+j2\pi f_0 t} \cdot e^{+j2\pi k_{e,up} t^2} \cdot rect\left[\frac{t}{T_P}\right]$$

$$s_{Tu,down}(t - \Delta t) = A_T \cdot e^{+j2\pi f_0(t-\Delta t)} \cdot e^{+j2\pi k_{e,down}(t-\Delta t)^2} \cdot rect\left[\frac{t-\Delta t}{T_P}\right]$$

The chirp rates in this case have an opposite sign and thus the following applies:

$$k_{e,up} = -k_{e,down} = \frac{k_e}{2} = \frac{B/2}{4T_P}$$

This definition has the effect that up-chirp and down-chirp together have exactly the bandwidth B. The relevant bandwidth has thus been halved by the modulation. Thus also the modulation wavelength has now been doubled $\lambda_{FM} = 4c_0/B$.

For calculating the received signals, a point target is assumed. As a result, on each receiver respectively one receiver signal is produced for up-chirp and down-chirp:

$$s_{RuTv,up}(t) = A_R \cdot e^{j2\pi f_0 t} \cdot e^{-j2\pi f_0 \tau_{nuv}} \cdot e^{j2\pi k_{e,up}(t-\tau_{nuv})^2} \cdot rect\left[\frac{t-\tau_{nuv}}{T_P}\right]$$

$$s_{RuTv,down}(t-\Delta t) =$$
$$A_R \cdot e^{j2\pi f_0(t-\Delta t)} \cdot e^{-j2\pi f_0 \tau_{nuv}} \cdot e^{j2\pi k_{e,down}(t-\Delta t-\tau_{nuv})^2} \cdot rect\left[\frac{t-\Delta t-\tau_{nuv}}{T_P}\right]$$

A distance compression is separately carried out for both received signals. As a result, the two distance compressed signals produce:

$$f_{RC,up}(\tau) = \frac{\sin(2\pi k_{e,up}(T_P|\tau - \tau_{nuv}| - (\tau - \tau_{nuv})^2))}{2\pi k_{e,up}(\tau - \tau_{nuv})}$$

$$A_T A_R \cdot rect\left[\frac{|\tau - \tau_{nuv}|}{T_P}\right] e^{j2\pi k_{e,up} T_P(\tau - \tau_{nuv})} e^{-j2\pi f_0 \tau_{nuv}}$$

$$f_{RC,down}(\tau - \Delta t) = \frac{\sin(2\pi k_{e,down}(T_P|\tau - \Delta t - \tau_{nuv}| - (\tau - \Delta t - \tau_{nuv})^2))}{2\pi k_{e,down}(\tau - \Delta t - \tau_{nuv})}$$

$$A_T A_R \cdot rect\left[\frac{|\tau - \Delta t - \tau_{nuv}|}{T_P}\right] e^{j2\pi k_{e,down} T_P(\tau - \Delta t - \tau_{nuv})} e^{-j2\pi f_0(\Delta t + \tau_{nuv})}$$

The time duration $\Delta t$ between the up-chirp and down-chirp is established by the pulse repetition rate PRF with $\Delta t = 1/PRF$. Hereinafter, a stationary scenario is to be assumed. Thus $\Delta t = 0$ may be assumed so that $f_{RC,down}(\tau - \Delta t) = f_{RC,down}(\tau)$. For eliminating the CW term the two distance compressed signals $f_{RC,up}$ and $f_{RC,down}$ are conjugate complex multiplied with one another. The root again produces a voltage magnitude from the power rating $$f_{RC,FM}(\tau) = \sqrt{f_{RC,up}(\tau) \cdot f^*_{RC,down}(\tau)}$$

$$= A_T A_R \frac{\sin\left(2\pi \frac{k_e}{2}(T_P|\tau - \tau_{nuv}| - (\tau - \tau_{nuv})^2)\right)}{2\pi \frac{k_e}{2}(\tau - \tau_{nuv})}$$

$$rect\left[\frac{|\tau - \tau_{nuv}|}{T_P}\right] \cdot e^{j2\pi \frac{k_e}{2} T_P(\tau - \tau_{nuv})}$$

No CW term is now contained in the result for $f_{RC,FM}$.

The distance compressed signal $f_{RC,FM}$ established by means of two sequential measurements with an up-chirp and a down-chirp, has the same character as a simple distance compressed signal. As the bandwidth is divided up into the measurement with up-chirp and down-chirp, the distance resolution is in this case determined by B/2. Thus a distance compressed signal may be obtained by two simple sequential measurements, which may be evaluated without the CW term by FM-DBF.

Figure 3:
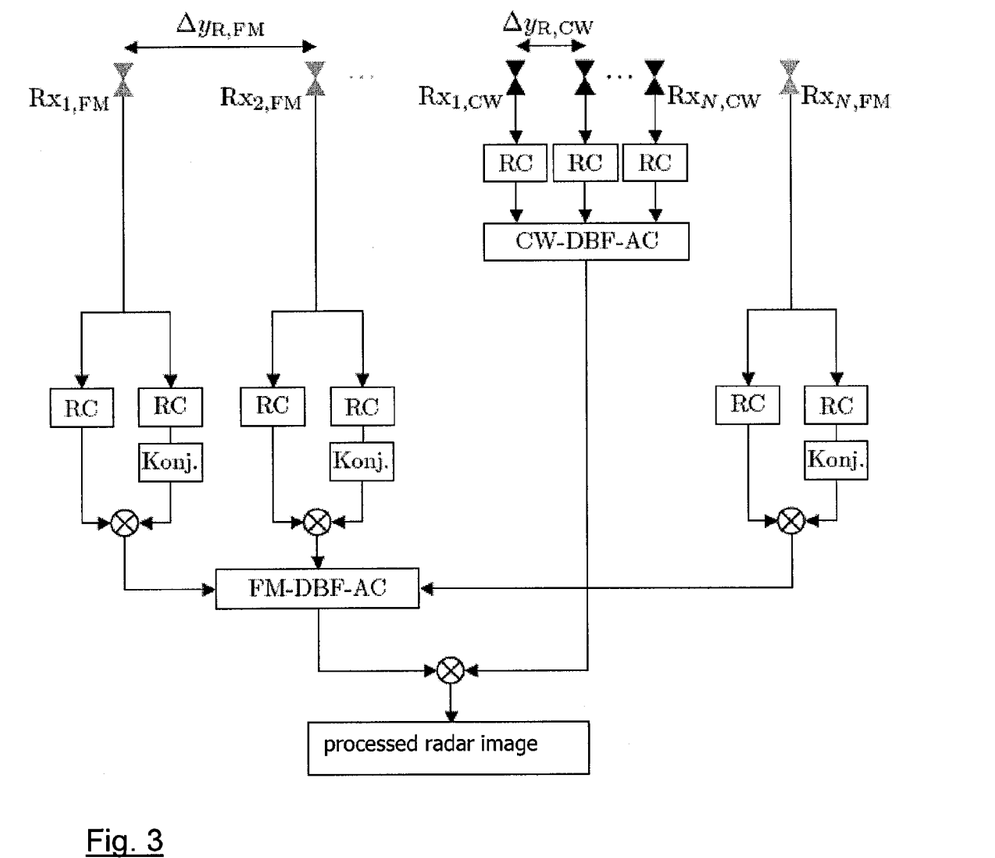
FIG. 3 shows a block diagram of an exemplary embodiment of the present invention.

For carrying out the proposed method, i.e. the combination of FM-DBF and CW-DBF, and for the configuration of the associated device, in the present example two antenna groups are used, as is visible from the block diagram of FIG. 3. The so-called FM antenna group has the receivers $Rx_{FM}$ at a mutual distance of $\Delta y_{R,FM}$. Their arrangement is selected relative to the wavelength $\lambda_{FM}$. The received signal obtained by this antenna group is evaluated by means of FM-DBF described above. In FIG. 3, this is indicated by the parallel receiver paths. For each of the two measurements for eliminating the CW exponential term, a distance compression takes place (RC), a subsequent conjugate complex multiplication (conj.) and the angular compression (FM-DBF-AC).

Additionally to this antenna group a conventional CW antenna group is used where the receivers $Rx_{CW}$ are at a mutual distance of $\Delta y_{R,CW}$. It is illustrated separately in FIG. 3, wherein in one embodiment of the device, however, one or more antennae also may be used both in the FM-antenna group and in the CW-antenna group. For processing the received signals of the CW-antenna group also a distance compression (RC) and an angular compression (CW-DBF-AC) are carried out. In this case the conventional type of angular processing known from the prior art is used for CW-DBF.

The results of the two angular compressions are multiplied to produce a combination, so that in the end a processed radar image is produced.

In order to combine the two antenna groups optimally with one another, they should be adjusted to one another. To this end, the CW-antenna group, in this case arbitrarily denoted as the first antenna group, is designed such that the desired resolution of the angular detection is achieved. The second antenna group is designed such that the ambiguities arising in the first antenna group, as a result of the suitably selected antenna distance of the second antenna group fall to the zero settings of the second antenna group, i.e. the FM-antenna group.

For the following example, an FM-antenna group and a CW-antenna group are used with respectively $N_{FM}=N_{CW}=3$ receiver antennae and a common transmitter antenna. The distance in the FM antenna group is in this case $\Delta y_{R,FM}=0.5 \cdot \lambda_{FM}=0.5 \cdot 4C_0/B=1.2$ m where B=500 MHz. In the CW-antenna group the distance $\Delta y_{R,CW}=1.5 \cdot \lambda_{CW}=18.75$ mm. In principle, in this case it is unimportant in which antenna group the greater distance occurs. However, in the example selected here it is more useful to use the smaller distance in the FM-antenna group, so that as a result of the greater wavelength $\lambda_{FM}$ this antenna arrangement does not become even greater. Thus possible near-field errors remain as small as possible.

Figure 4:
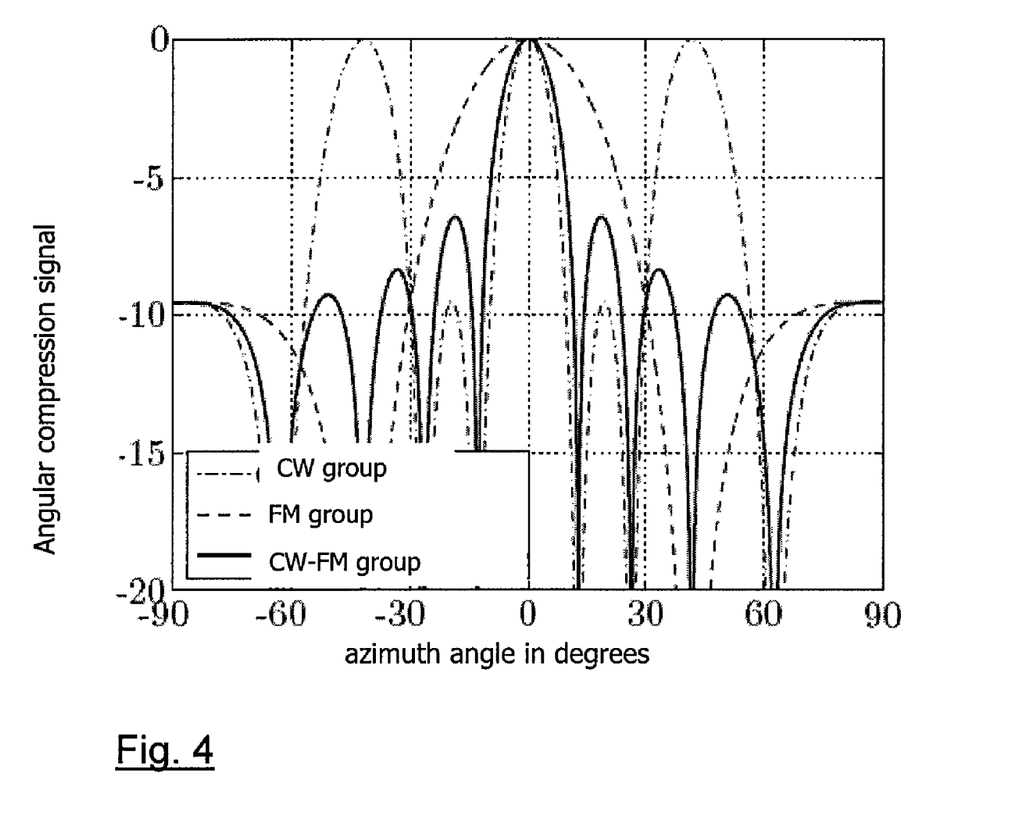
FIG. 4 shows an example of the group factors of the antenna groups in the embodiment according to FIG. 3.

FIG. 4 shows the group factors for the FM-antenna group and CW-antenna group as well as the result of the superimposition of the two group factors. As in this embodiment respectively only $N_{CW}=N_{FM}=3$ antennae are used, for both group factors a higher secondary maximum results than −13 dB which is usual for this field. The ambiguity of the CW group factor falls exactly to the zero setting of the FM group factor and is no longer relevant, therefore, in the superimposition of the two group factors. For the superimposition of the two group factors, the roots have to be taken from the product of the two linear group factors, moreover, in order to obtain a notation relating to the voltage.

By utilizing the novel FM-DBF and the combination of FM-DBF and CW-DBF proposed here, ambiguities in CW-DBF may be eliminated. The FM-antenna group has been dimensioned in this embodiment such that it permits an unambiguous angular measurement with moderate resolution. The CW-antenna group forms with few antenna elements a relatively large, sparsely occupied aperture. As a result of the large aperture of the CW-antenna group relative to the wavelength $\lambda_{CW}$, a high angular resolution is achieved.

While the invention has been illustrated and described in detail in the drawings and foregoing description, such illustration and description are to be considered illustrative or exemplary and not restrictive. The invention is not limited to the disclosed embodiments. The different embodiments described above and in the claims can also be combined. Other variations to the disclosed embodiments can be understood and effected by those skilled in the art in practicing the claimed invention, from the study of the drawings, the disclosure and the appended claims.

In the claims, the word "comprising" does not exclude other elements or steps, and the indefinite article "a" or "an" does not exclude a plurality. The mere fact that measures are recited in mutually different dependent claims does not indicate that a combination of these measures cannot be used to advantage.

The invention claimed is:

1. Method for angular determination and/or for increasing an angular resolution and/or a detectable angular range when operating antenna groups using the technique of digital beam forming (DBF), in which
   a measurement signal comprising a carrier signal and a frequency-modulated signal component is received via at least one antenna group directly or after reflection on one or several objects, and
   an angle, at which the measurement signal is received by the antenna group, is determined by evaluating a phase difference in the received measurement signal, which occurs between adjacent antenna elements of the antenna group when receiving the measurement signal, characterised in that
   for determining the phase difference the frequency-modulated signal component is also evaluated, exclusively or additionally to an evaluation of the carrier signal and two antenna groups are used, of which a first antenna group is configured for a high angular resolution relative to the second antenna group by evaluating the carrier signal, and the second antenna group is configured for evaluating the frequency-modulated signal component.

2. Method according to claim 1,
   characterised in that
   said measurement signal is a frequency-modulated radar signal.

3. Method according to claim 1,
   characterised in that
   said measurement signal has a carrier frequency and a frequency modulation, in which a bandwidth of the frequency modulation is between $0.1 \cdot f_0$ and $f_0$, $f_0$ being the magnitude of the carrier frequency.

4. Method according to claim 1,
   characterised in that
   one or several or all antenna elements of the first antenna group are also used as a component of the second antenna group.

5. Method according to claim 1,
   characterised in that
   distances between the antenna elements of the first and second antenna group are selected such that ambiguities of a first group factor during the evaluation of the carrier signal using the first antenna group fall to minimum values, in particular zero settings, of a second group factor during evaluation of the frequency-modulated signal component using the second antenna group.

6. Method according to claim 1,
   characterised in that
   for eliminating a term based on the carrier signal during evaluation of the frequency-modulated signal component a sequential measurement is carried out, in which a first measurement signal is used with an up-chirp and a second measurement signal is used with a down-chirp—or vice versa.

7. Method according to claim 1,
   characterised in that
   a distance of said one or several objects is additionally determined via an evaluation of the measurement signal.

8. Device for digital beam forming (DBF) comprising
   at least one antenna group for receiving a measurement signal, which comprises a carrier signal and a frequency-modulated signal component, and
   an evaluation device which evaluates the measurement signal received via the antenna group by means of digital beam forming, in order to determine at least one angle at which the measurement signal is received by the antenna group, the angle being determined by evaluating a phase difference in the received measurement signal, which occurs between adjacent antenna elements of the antenna group when receiving the measurement signal, characterised in that
   the evaluation device is configured such that for determining the phase difference it also evaluates the frequency-modulated signal component of the received measurement signal, exclusively or additionally to an evaluation of the carrier signal and the device comprises two antenna groups of which a first antenna group is configured for a high angular resolution relative to a second antenna group by evaluating the carrier signal and the second antenna group is configured for evaluating the frequency-modulated signal component.

9. Device according to claim 8,
   characterised in that
   the device further comprises a transmitter device which transmits the measurement signal into an area to be monitored.

10. Device according to claim 9,
    characterised in that
    the transmitter device transmits a frequency-modulated radar signal as said measurement signal.

11. Device according to claim 9,
    characterised in that
    the transmitter device transmits said measurement signal with a carrier frequency and a frequency modulation, in which a bandwidth of the frequency modulation is between $0.1 \cdot f_0$ and $f_0$, $f_0$ being the magnitude of the carrier frequency.

12. Device according to claim 9,
    characterised in that
    the transmitter device is configured such that it alternately transmits a first measurement signal with an up-chirp and a second measurement signal with a down-chirp—or vice versa.

13. Device according to claim 8,
    characterised in that
    the evaluation device is configured such that it determines a distance from one or more objects via an evaluation of the received measurement signal.

14. Device according to claim 8,
    characterised in that
    the two antenna groups comprise one or several common antenna elements.

15. Device according to claim 8, characterised in that distances between the antenna elements of the first and second antenna group are selected such that ambiguities of a first group factor during evaluation of the carrier signal using the first antenna group fall to minimum values, in particular zero settings, of a second group factor during evaluation of the frequency-modulated signal component using the second antenna group.

* * * * *